(12) United States Patent
Critchfield

(10) Patent No.: US 9,948,412 B2
(45) Date of Patent: Apr. 17, 2018

(54) SYSTEM, METHOD, AND APPARATUS FOR WIRELESS CAMERA DETECTION

(71) Applicant: Mary Cecilia Critchfield, Clearwater, FL (US)

(72) Inventor: Mary Cecilia Critchfield, Clearwater, FL (US)

( * ) Notice: Subject to any disclaimer, the term of this patent is extended or adjusted under 35 U.S.C. 154(b) by 0 days.

(21) Appl. No.: 15/475,320

(22) Filed: Mar. 31, 2017

(65) Prior Publication Data
US 2017/0207865 A1    Jul. 20, 2017

Related U.S. Application Data

(63) Continuation-in-part of application No. 14/575,461, filed on Dec. 18, 2014, now Pat. No. 9,646,479.

(60) Provisional application No. 61/929,242, filed on Jan. 20, 2014.

(51) Int. Cl.

| | |
|---|---|
| *H04B 17/00* | (2015.01) |
| *H04B 17/23* | (2015.01) |
| *H04B 17/318* | (2015.01) |
| *G08B 7/06* | (2006.01) |
| *H04W 8/00* | (2009.01) |
| *G08B 23/00* | (2006.01) |
| *H04M 1/725* | (2006.01) |
| *H04N 5/64* | (2006.01) |
| *H04M 1/68* | (2006.01) |

(52) U.S. Cl.
CPC ............. *H04B 17/23* (2015.01); *G08B 7/06* (2013.01); *G08B 23/00* (2013.01); *H04B 17/318* (2015.01); *H04M 1/72522* (2013.01); *H04W 8/005* (2013.01); *H04M 1/68* (2013.01); *H04M 1/72536* (2013.01); *H04M 2250/12* (2013.01); *H04N 5/64* (2013.01)

(58) Field of Classification Search
CPC ...... H04B 17/23; H04B 17/318; H04W 8/005
USPC ........................................................ 455/67.7
See application file for complete search history.

(56) References Cited

U.S. PATENT DOCUMENTS

| | | | |
|---|---|---|---|
| 5,742,233 A | 4/1998 | Hoffman et al. | |
| 6,359,582 B1 | 3/2002 | MacAleese et al. | |
| 6,621,418 B1 | 9/2003 | Cayrol | |
| 6,624,752 B2 | 9/2003 | Klitsgaard et al. | |
| 6,665,079 B1 | 12/2003 | Tocci et al. | |
| 6,937,163 B2 | 8/2005 | Caulfield et al. | |
| 7,671,718 B2 | 3/2010 | Turner et al. | |
| 7,912,427 B2 * | 3/2011 | Santoru | H04H 20/12 343/757 |
| 8,077,209 B2 | 12/2011 | Kamatani et al. | |
| 8,157,396 B2 | 4/2012 | Smith, Jr. et al. | |
| 8,453,926 B2 | 6/2013 | Hunt | |
| 2002/0103013 A1 * | 8/2002 | Watson | G01S 3/42 455/562.1 |
| 2004/0127162 A1 * | 7/2004 | Maki | H04W 24/00 455/67.11 |

(Continued)

*Primary Examiner* — Raj Chakraborty
(74) *Attorney, Agent, or Firm* — Larson & Larson, P.A.; Frank Liebenow

(57) ABSTRACT

A system, method, and apparatus for detecting wireless video cameras includes receiving radio waves in a radio frequency band and filtering the radio waves. Then it is determined whether a signal strength of the radio waves exceeds a threshold for a period of time, indicating that a video signal is present and if a video signal is present, the detection of a wireless video signal is signaled (e.g., making noise, vibrating, illuminating, blinking).

14 Claims, 14 Drawing Sheets

(56) References Cited

U.S. PATENT DOCUMENTS

| | | |
|---|---|---|
| 2005/0104731 A1 | 5/2005 | Park |
| 2007/0103552 A1 | 5/2007 | Patel et al. |
| 2008/0001764 A1 | 1/2008 | Douglas et al. |
| 2010/0056207 A1 | 3/2010 | Yang |
| 2010/0323608 A1 | 12/2010 | Sanhedrai et al. |
| 2012/0075093 A1 | 3/2012 | Cheng |
| 2012/0212339 A1 | 8/2012 | Goldblatt |
| 2014/0107493 A1* | 4/2014 | Yuen .................... H04W 4/027 600/473 |
| 2014/0123840 A1 | 5/2014 | Kim et al. |
| 2014/0295831 A1 | 10/2014 | Karra |

* cited by examiner

SYSTEM, METHOD, AND APPARATUS FOR WIRELESS CAMERA DETECTION

CROSS-REFERENCE TO RELATED APPLICATION

This application is a continuation-in-part of U.S. patent application Ser. No. 14/575,461, filed Dec. 18, 2014 which claims the benefit of U.S. provisional patent application Ser. No. 61/929,242, filed Jan. 20, 2014, the disclosure of which are hereby incorporated by reference.

FIELD

This invention relates to the field of portable electronics and more particularly to a system for detecting the operation of video cameras.

BACKGROUND

Over the past few decades, video cameras have evolved from stand-mounted devices too heavy for a person to carry down to a ubiquitous, tiny device. By, "ubiquitous," a large percentage of the world's population have at least one video camera, in particular, as an included feature of most modern cellular phones (cell phones).

The video camera has evolved from vacuum tube light detectors that required high amounts of power and were typically large, to smaller vacuum tube based cameras that were small enough to be hand held, yet still requiring substantial power. In the later 1900s, new image detectors emerged using arrays of charge coupled devices or photo detectors (e.g. arrays of photo diodes) to detect light energy. These detectors enabled the proliferation of video cameras into many aspects of our lives, from video surveillance to the cameras in most cell phones that are sold today. These image sensors are found in low cost, small home video surveillance systems, in hand-held video recorders, in dash-mounted or body-worn video recorders (law enforcement), dash-cams, etc. The amount of video that is captured in a single day is astonishing.

Some small, low-power video cameras are integrated with wireless transmission technology (e.g., Wi-Fi) and batteries, creating easy-to-install home surveillance systems that easily install anywhere and relay their video signal to the Internet or to a home computer.

There is huge value in the vast amount of video data that is collected every day. Dash-cam video helps sort out who did what if an accident occurs, police worn cameras help protect law enforcement members from being accused of wrongful acts, home video surveillance helps identify thieves or monitor homes while on vacation, vehicle back-up cameras save lives every day, especially young children. The positive uses for modern, low cost, small sized video cameras are countless.

Unfortunately, as with many things, there will always be some subset of the population that will find negative uses for anything. In one example, some people who lack moral character find it rewarding to install wireless video cameras in places where others would not expect to be watched. Recent arrest reports include people being arrested for installing hidden video cameras in public restroom facilities, in dorm rooms, in locker rooms, dressing rooms, hotel rooms, etc. Further, some people install having hidden cameras throughout their home (e.g., in areas of intimacy), recording encounters with others without the knowledge of the other person. There have been documented cases of landlords installing hidden cameras in rental apartment showers or lovers installing hidden cameras in bedrooms, etc. Many of such recordings are somehow used by the person capturing the video, but in some cases, the person illegally discloses the video, perhaps on a web page (on the Internet), or worse, to the press, possibly exposing video images containing nudity and intimacy that severely hurts the other person in many ways. As an example, there were several videos of famous actors and singers (male and female) that were made public without those actresses'/singers' consent.

There are many places where cameras have been hidden, for example, within a smoke detector, in a water bottle, in a coffee cup lid, etc.

After undesired video recording occurs, the victim typically has little evidence other than the recorded product. It will be useful during prosecution to have better evidence of the location of the hidden camera(s).

What is needed is a portable system that will warn a person about the presence of a wireless video camera.

SUMMARY

In one embodiment, a portable system for detecting wireless video cameras is disclosed including an enclosure. At least one video receiver is housed within the enclosure. Each of the at least one video receiver operates in a radio frequency band typically used for video transmission. At least one antenna is housed within the enclosure, each of the at least one antenna is operatively coupled to a respective video receiver. A sync detector is operatively coupled to the output of each of the at least one video receiver and is housed within the enclosure. The sync detector signals an output upon detection of synchronization signals present within the output of any of the at least one video receivers. An indication device is also housed within the enclosure as is a processor. The processor is coupled to the output of the sync detector and to the indication device. The processor determines if the portable system for detecting wireless video cameras is receiving a wireless video signal and, responsive to detecting, the processor initiates operation of the indication device (e.g., making noise, vibrating, or illuminating).

In another embodiment, a method of detecting wireless video cameras is disclosed including receiving radio waves in a radio frequency band and filtering and down-converting the radio waves into an intermediate frequency. The intermediate frequency is then filtered, amplified, and demodulated into an FM video signal. Then it is determined whether synchronization pulses exist within the FM video signal and if substantial synchronization pulses exist within the FM video signal the detection of a wireless video signal is signaled (e.g., making noise, vibrating, or illuminating).

In another embodiment, a portable apparatus for detecting wireless video cameras is disclosed including an enclosure (e.g. for wearing or carrying), a video receiver that has an antenna coupled to a band pass filter tuned to a radio frequency band and a down converter that converts radio frequencies from the band pass filter into intermediate frequencies. The video receiver housed within the enclosure. The portable apparatus for detecting wireless video cameras also has a sync detector with an intermediate frequency band pass filter that takes input from the video receiver. An input of an intermediate frequency amplifier is coupled to an output of the intermediate frequency band pass filter and feeds an FM demodulator, which in turn is coupled to a sync pulse detector. An output of the sync pulse detector signals an output upon detection of synchronization signals to a processor. The processor determines if the portable system for detecting wireless video cameras is receiving a wireless video signal (e.g., a pre-programmed number of consecutive sync pulses are detected) and, responsive to detecting, the processor initiates operation to notify of the presence of the wireless video signal by, for example, making noise, vibrating, or illuminating. The processor is also housed within the enclosure.

In another embodiment, a portable system for a detecting wireless video camera is disclosed including an enclosure. At least one video receiver operating in a radio frequency band used for video transmission is housed within the enclosure. At least one antenna is housed within the enclosure, each of which is operatively coupled to a respective video receiver. A signal strength detector is connected the output of the at least one video receiver and is housed within the enclosure. An indication device is housed within the enclosure. A processor is housed within the enclosure. The processor is operatively coupled to the output of the signal strength detector and coupled to the indication device such that, the processor determines if the portable system for detecting wireless video cameras is receiving a wireless video signal and, responsive to detecting the wireless video signal, the processor initiates operation of the indication device. At least one sensor is also housed within the enclosure and operatively coupled to the processor. The sensor provides fitness/health data such that the processor presents fitness/health data on a display that is operatively coupled to the processor.

In another embodiment, a method of detecting wireless video cameras is disclosed including receiving radio waves in a radio frequency band and filtering the radio waves to measure a signal strength of the radio waves. If the signal strength of the radio waves is above a threshold for a period of time, the detection of a wireless video signal is signaled. Data is received from at least one fitness/health sensor and the data is recorded. Fitness/health data is derived from the data and displayed.

In another embodiment, a portable apparatus for detecting wireless video cameras is disclosed including an enclosure (e.g. for wearing or carrying) and a video receiver comprising an antenna coupled to a band pass filter that is tuned to a radio frequency band. The video receiver is also housed within the enclosure. A signal strength detector is operatively coupled to the video receiver, an output of which is coupled to a processor. The signal strength detector signaling an output proportional to a signal strength of a signal in the radio frequency band. The signal strength detector is also housed within the enclosure. The processor determines if the portable system for detecting wireless video cameras is receiving a wireless video signal by the signal strength exceeding a threshold for a period of time, and responsive to detecting, the processor initiates operation to notify of the presence of the wireless video signal, the processor housed within the enclosure. At least one fitness sensor is housed within the enclosure and is operatively coupled to the processor. The processor receives fitness/health data from the at least one fitness/health sensor, derives fitness/health information from the fitness/health data, and displaying the fitness/health information on a display that is housed within the enclosure and operatively coupled to the processor.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
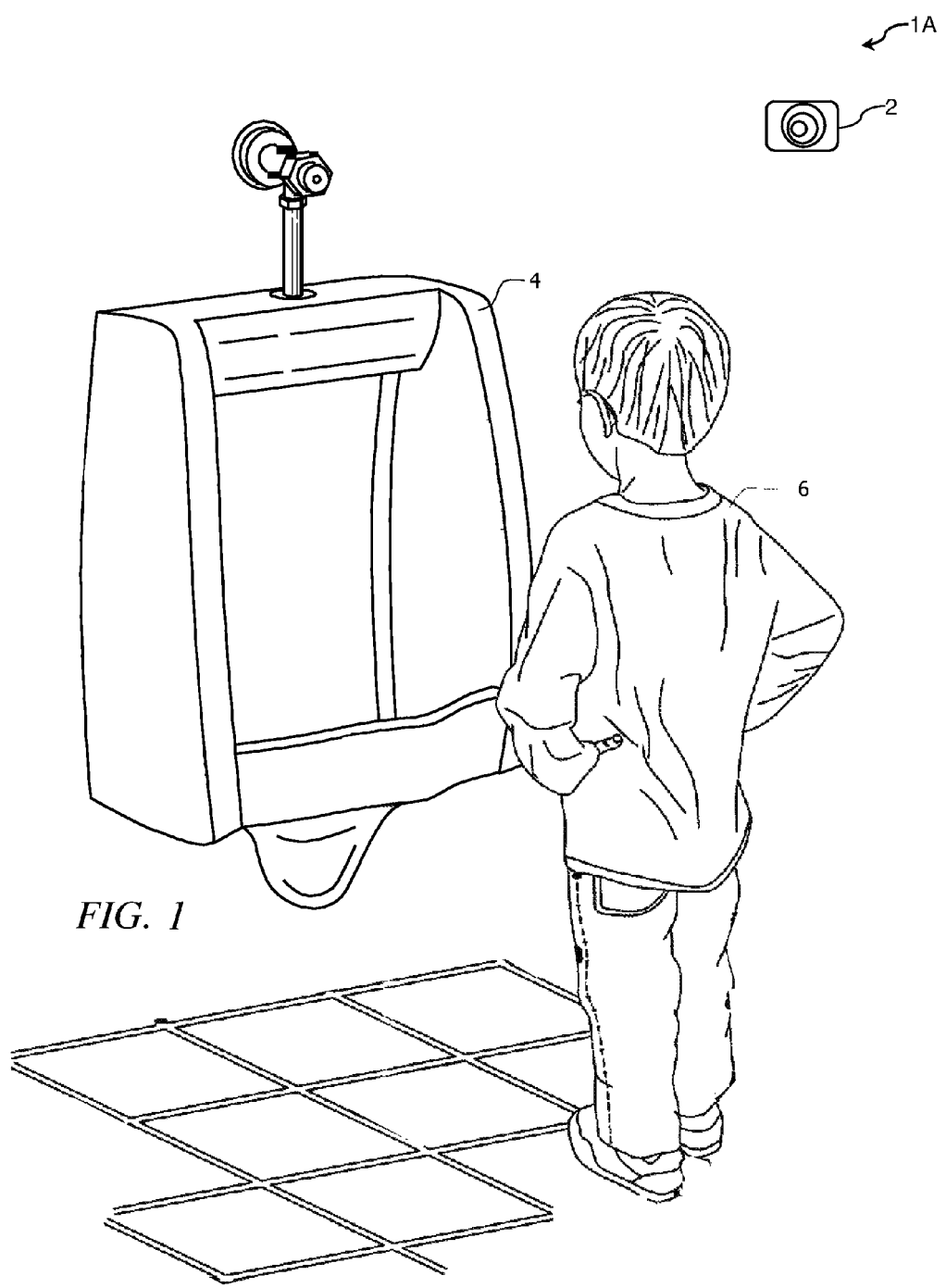
FIG. 1 illustrates a perspective view of a wireless video camera installed in a public facility.

Reference will now be made in detail to the presently preferred embodiments of the invention, examples of which are illustrated in the accompanying drawings. Throughout the following detailed description, the same reference numerals refer to the same elements in all figures.

Throughout this description, the term fitness/health tracker function refers to functionality of a device that presents fitness and/or health information to a user such as presenting number of steps taken, number of miles walked, number of flights of stairs climbed, heart rate, oxygen levels, body temperature, etc. Therefore, the fitness/health data read from the fitness/health sensors is data that is used to derive such fitness/health information and the fitness/health sensors are such that measure/monitor parameters associated with a being's activity, biological functions, environment, etc. For example, an atmospheric pressure sensor in conjunction with a pedometer sensor is used to determine how many flights of steps a user has climbed.

Figure 2:
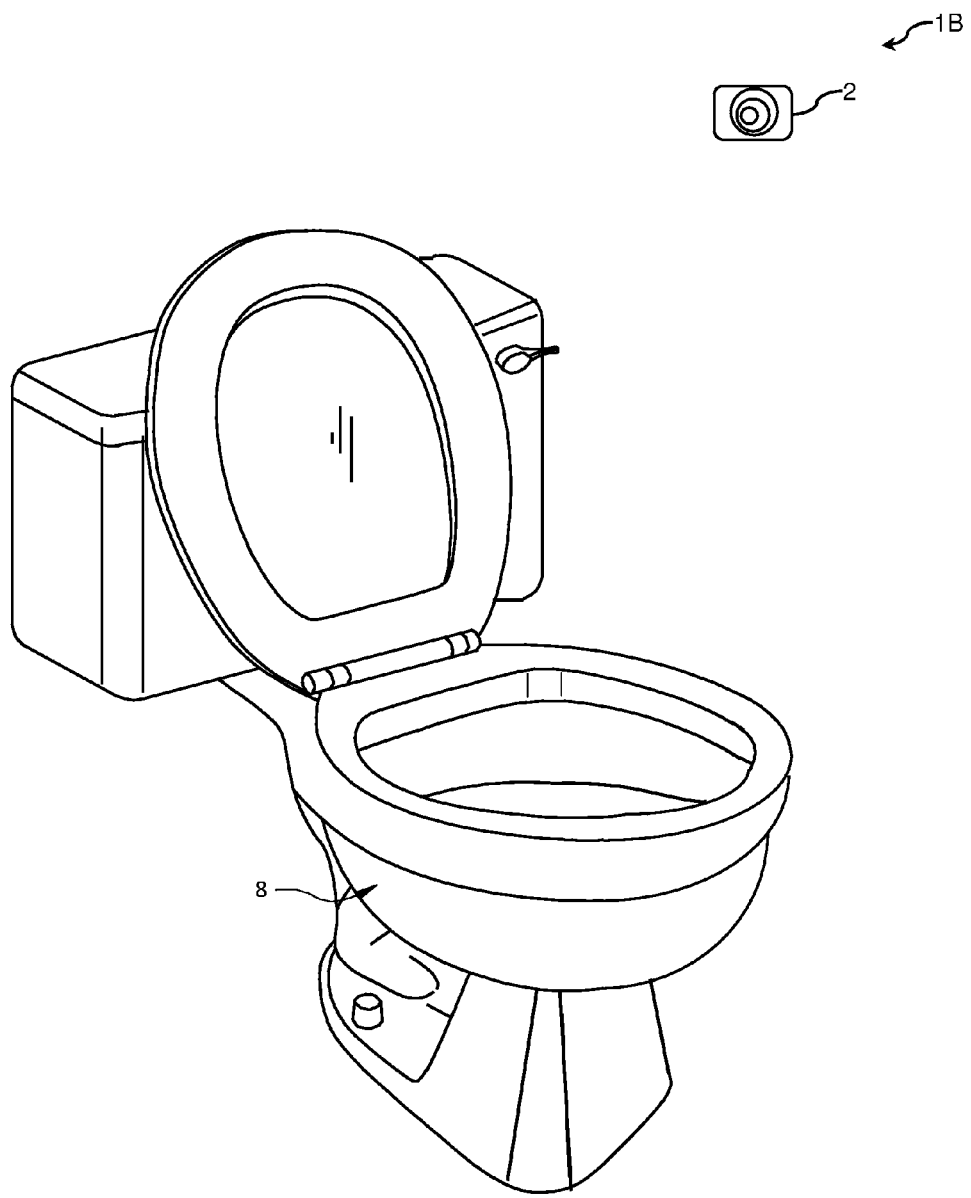
FIG. 2 illustrates a perspective view of a wireless video camera installed in another public facility.

Referring to FIGS. 1 and 2, perspective views of a wireless video camera 2 installed in a public facility (1A in FIGS. 1 and 1B in FIG. 2 are shown. Although a public facility 1A/1B is shown for exemplary purposes, wireless video cameras 2 are often installed in many locations, often unknown to people who venture into such locations.

To provide easy installation of many such video cameras, manufacturers have integrated small-sized image sensors with wireless transmitters (or transceivers) along with sufficient battery power to simplify installation, not requiring wires for power and/or video signals, Before such wireless video cameras 2 were available, installation of surveillance systems required installing these wires within walls, ceiling, floors, etc., which is difficult and expensive, especially in homes and offices that are already constructed. Installation is somewhat easier before construction is complete, but after construction is complete, it is difficult to relocate these video cameras.

Now, with battery powered, wireless video cameras 2, installation is simply un-boxing, installing a battery, placing the wireless video camera 2 (affixing, gluing) where desired, and connecting a wireless receiver to, for example, a personal computer.

As shown in FIGS. 1 and 2, some person, perhaps with bad intent, has installed a wireless video camera 2 in a restroom 1A/1B, perhaps hoping to capture video of an unsuspecting user of the restroom 1A/1B. Being that many wireless video cameras 2 are extremely small, it is often easy for such people to hide the wireless video camera 2 so it is difficult to visually detect. In FIG. 1, a young boy 6 is preparing to use a wall-mounted urinal 4, while in FIG. 2, a bathroom fixture 8 is shown. It has been known to mount such wireless video cameras 2 under the rim of the bathroom fixture 8.

Typically, each wireless video camera 2 modulates the video signal on certain unlicensed radio frequency band(s). Each pixel of the image as detected by an image sensor within each wireless video camera 2 is rasterized (serialized) a frame (set of pixels representing the image at an instance of time) at a time onto a standard video signal that includes synchronization pulses that are used to reconstruct the detected image, frame at a time. The video signal is then modulated on an unlicensed radio frequency band such as the 902-928 MHz, 2.40-2.50 GHz, and the 5.725-5.875 GHz unlicensed radio frequency bands. Such bands are also referred to as Industrial, Scientific, and Medical bands (ISM bands). Although unlicensed bands are shown in the examples, there is no limitation as to the radio frequency band used by wireless video cameras 2, and therefore, the disclosed systems are also anticipated to work at any frequency of the magnetic spectrum, including radio frequencies as well as light frequencies.

At a different location, a receiver tuned to the same unlicensed radio frequency band receives the modulated video signal and subtracts the modulation frequency, resulting in an unmodulated video signal. The sync pulses within the unmodulated video signal are used by the receiver to determine when each frame and when each line within the frame begins and, using such, the receiver reassembles each video frame which is, for example, displayed or stored. In some wireless video systems, the frames are compressed before storing using, for example, MPEG-2 or MPEG-4 image compression standards.

Note that, there is no limitation on the type of wireless video camera 2 and no limitation on the transmission frequencies, modulation techniques, and encoding used. The disclosed detection system is adaptable to any transmission frequencies, modulation techniques, and/or encoding. The examples used cover the more prevalent wireless video cameras 2 as currently understood.

Figure 3:
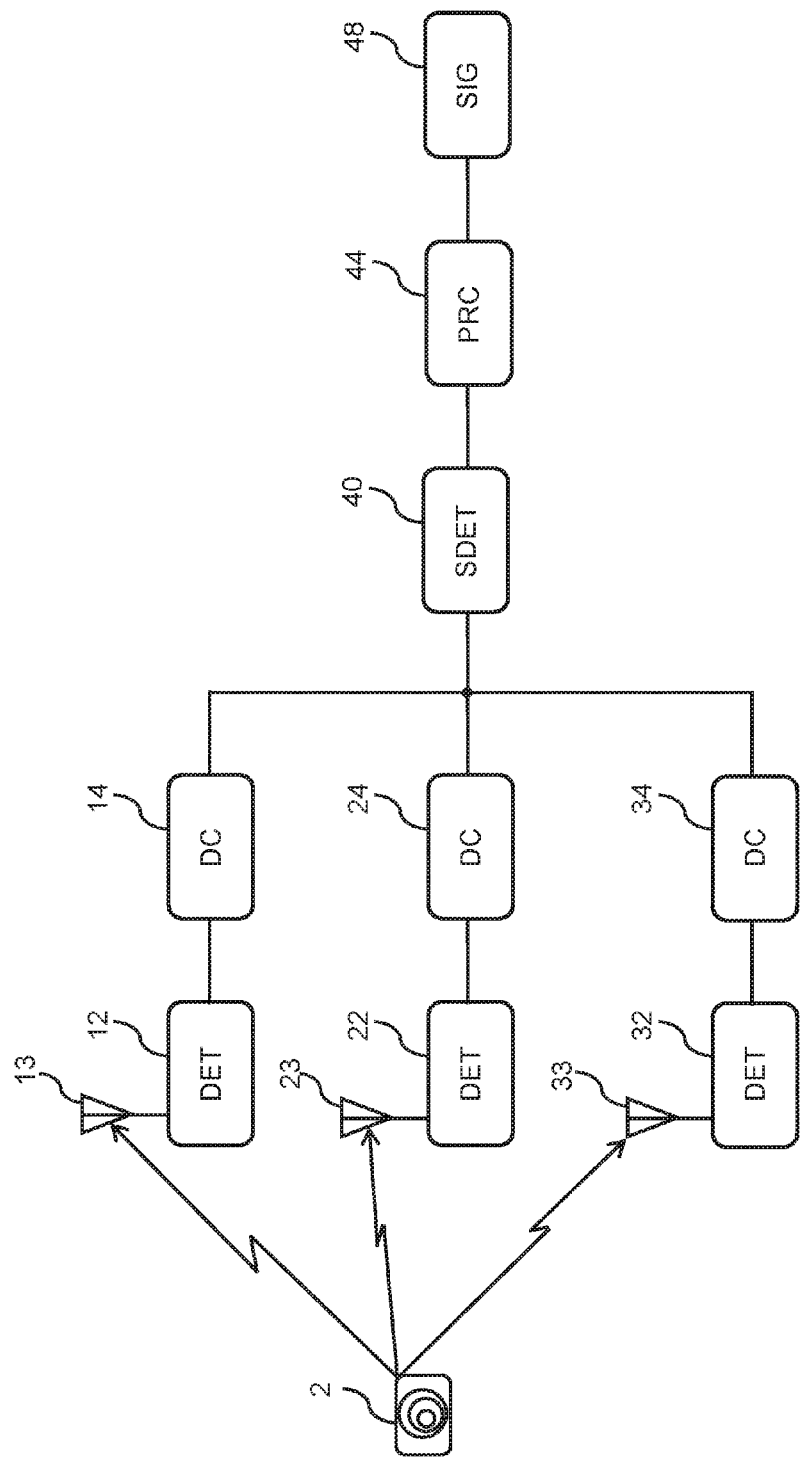
FIG. 3 illustrates a schematic view of a system for detecting wireless video cameras.
Figure 4:
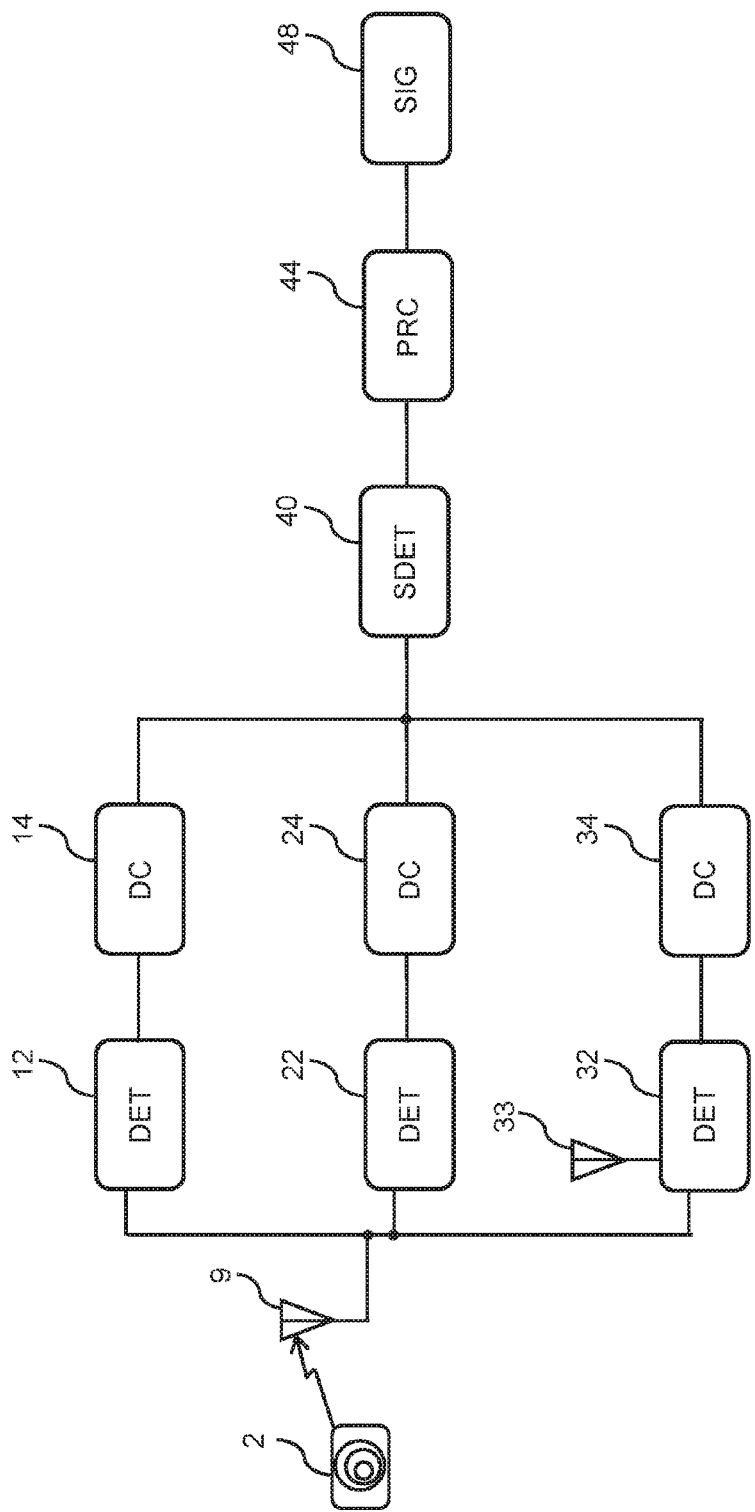
FIG. 4 illustrates a second schematic view of a system for detecting wireless video cameras.
Figure 5:
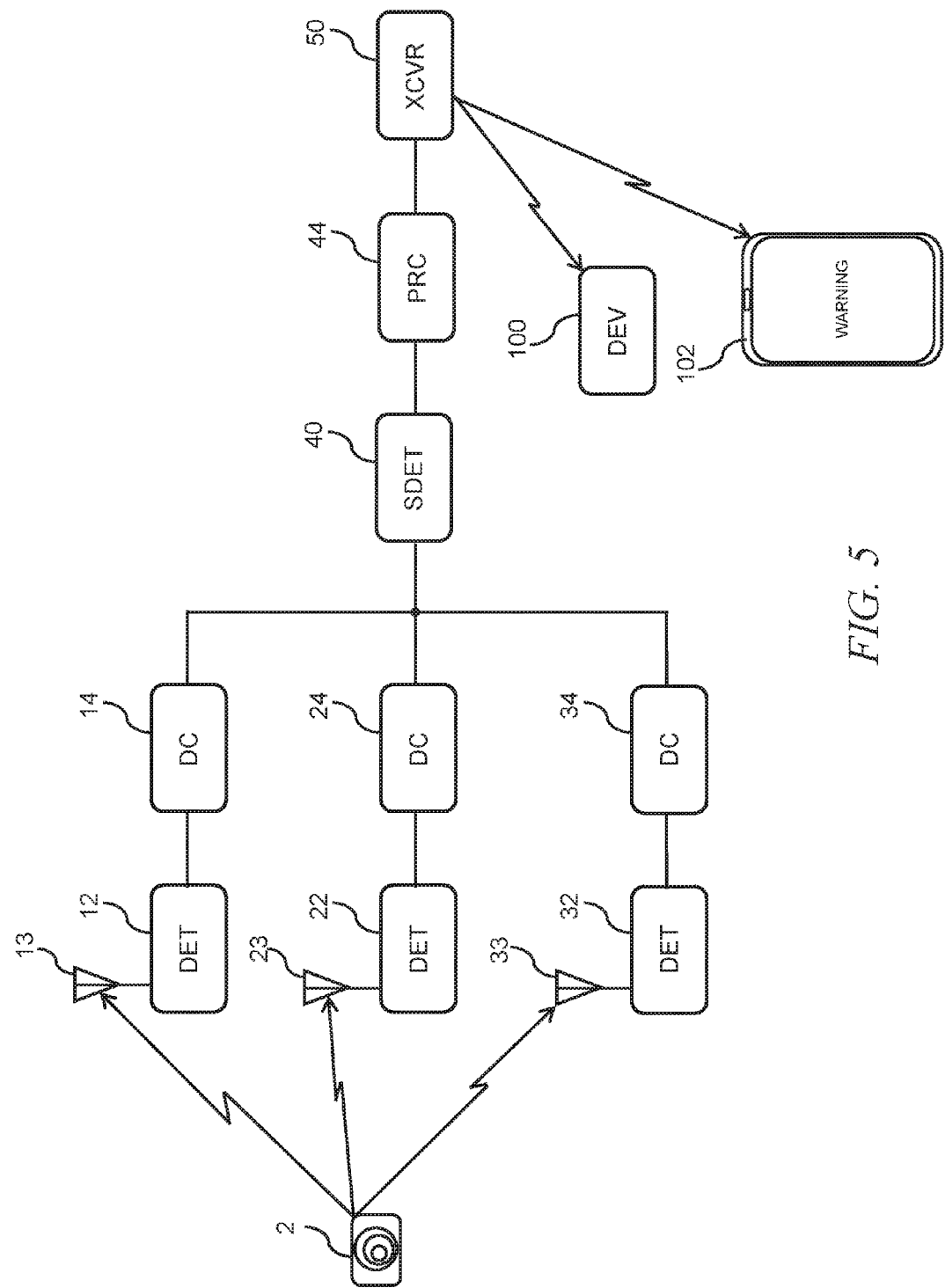
FIG. 5 illustrates a third schematic view of a system for detecting wireless video cameras.

Referring to FIGS. 3 through 5, schematic views of a system for detecting wireless video cameras 10 are shown. Note that, in all three examples, a simplified system for detecting wireless video cameras 10 is shown for clarity purposes. It is fully anticipated that in some systems for detecting wireless video cameras 10, more or less detectors 12/22/24 are employed and/or additional detectors to recognize other video transmission schemes such as transmitting video over Bluetooth, Wi-Fi (e.g. IEEE 802.11), or light wave transmission over, for example, infrared. It is further understood that any type and number of indication devices 48 be employed such as illuminated indicators (e.g., LEDs), vibration indicators (e.g., micro-motor with offset weight on shaft), sounders, buzzers, bells, etc. In some embodiments, there are no indication devices 48 within the system for detecting wireless video cameras 10 and, instead, the system for detecting wireless video cameras 10 emits a wireless signal (e.g. Bluetooth) that is linked to another device such as a cell phone 102 or music player, which logs the event (and possibly the location) and, optionally, makes an indication of detection by, for example, displaying a message, vibrating, making noise, illuminating, etc.

Figure 10:
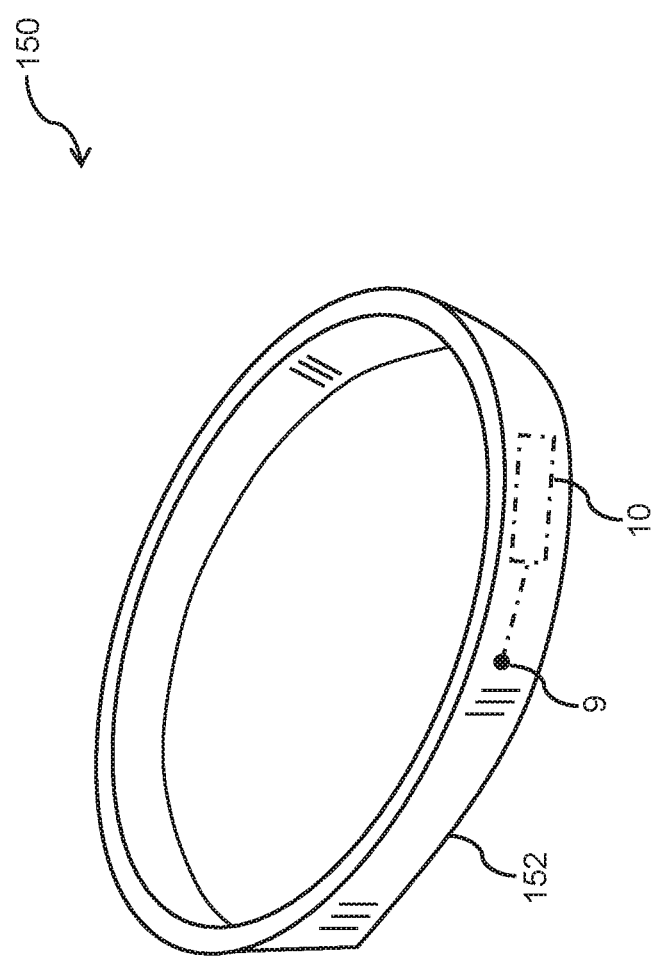
FIG. 10 illustrates a perspective view of an exemplary body-worn embodiment of the system for detecting local wireless video camera.

It is also anticipated that the system for detecting wireless video cameras 10 be packaged in any portable format, such that the system for detecting wireless video cameras 10 and power source (e.g. replaceable or rechargeable battery) is difficult to detect by others. For example, as shown in FIG. 10, the system for detecting wireless video cameras 10 is integrated into an ornamental bracelet, therefore, the system for detecting wireless video cameras 10 takes the form of fashion. In other body-worn or portable packaging options, the system for detecting wireless video cameras 10 is packaged as a pendant, pin, cuff link, earring, etc. In some embodiments, the packaging is designed to be worn while in others, the packaging is designed to be carried in, for example, a handbag, purse, wallet, pocket, etc. The small size and packaging design provides some degree of camouflage. It is anticipated that after some amount of time in public, people will start to recognize the style, shape, and color of such packages. Therefore, some packaging is designed to be stealthier, fitting inside a purse or handbag, or in one's pocket or clipped onto clothing, belts, socks, or pockets. Further, it is also anticipated that as various designers create fashion accessories that have cavities for storing small electronic devices such as exercise trackers, diet trackers, health monitors, etc., the packaging is designed to fit within such cavities.

In the system for detecting wireless video cameras 10 as per FIGS. 3 through 6, the radio frequency signal emitted by the wireless video camera 2 is received by one or more antenna 9/13/23/33 of the system for detecting wireless video cameras 10. In FIGS. 3 and 5, each anticipated radio frequency is received by separate antennae 13/23/33 (or elements), and in such, each antenna is anticipated to be tuned to one of the anticipated radio frequencies or a band of the anticipated radio frequencies. In FIG. 4, a single antenna 9 is used to receive all anticipated radio frequencies. Any small sized (e.g. micro-antenna) is anticipated. In some examples, one or more antenna 9/13/23/33 with multiple elements for receiving multiple radio frequencies or bands of radio frequencies are used.

The radio frequency signal from the antenna 9/13/23/33 is then detected by one or more detectors 12/22/32, each detector operating on one or more frequencies on which wireless video cameras 2 typically operate. Although it is shown that the detectors 12/22/32 operate on specific frequencies, it is fully anticipated that some detectors 12/22/32 sweep over a series or range of frequencies, stopping when finding a radio frequency signal that has significant signal strength.

The output of each detector 12/22/32 is modulated video signal. Each output (modulated video signal) is coupled to a respective down converter 14/24/34 which extracts the video signal from the radio frequency signal. In such, the video signal includes pixel information and synchronization pulses (e.g. horizontal and vertical synchronization pulses) that are typically used by the receiver of the video signal to reconstruct the video, frame by frame. In the exemplary systems for detecting wireless video cameras 10, these synchronization pulses that are used to determine if the radio frequency signal contains encoded video, although other detection schemes are also fully anticipated and included here within. For example, in some embodiments, the radio frequency signal emitted by the wireless video camera conforms to certain wireless local area network standards such a Bluetooth and Wi-Fi (e.g., IEEE 802.11). In such, different detectors 12/22/32 are employed that receive data according to such standards and determine if the data contains video data by, for example, monitoring data streams for MPEG-2 or MPEG-4 encoded data, etc.

In the embodiments shown in FIGS. 3 through 5, outputs of the down converters 14/24/34 are combined and feed a sync detector 40. If any of the detectors 12/24/34 and down converters 14/24/34 emits video output indicative of a video transmission (e.g. synchronization pulses), this presence of a synchronization signal is detected the synchronization detector 40 and the output of the synchronization detector 40 changes (e.g. changes from high to low or low to high) indicating the presence of a synchronization signal.

The output of the synchronization detector 40 is monitored by a processor 44 or logic (e.g. a logic array) to determine and/or record instances of video transmission. The detection of a single synchronization pulse is generally not indicative of a wireless video camera 2, but the detection of several sequential synchronization pulses by the processor 44 (or logic), especially if the synchronization pulses are separated in time by a standard amount as defined, for example, by the National Television System Committee (NTSC) standard in North America (e.g. synchronization pulses approximately every 16.6 milliseconds). Again, note that in various parts of the world, other standards and timing are utilized such as Phase Alternating Line (PAL) and Sequential Color with Memory (SECAM).

Although the presence of synchronization pulses is deemed a good indication of the presence of a wireless video camera 2, it is fully anticipated that other factors be also considered such as signal strength of the radio frequency signal as detected by each of the detectors 12/22/32. For example, if the signal strength of each of the detectors 12/22/32 is very low, yet a significant stream of synchronization pulses is detected by the synchronization detector 40 and processor 44 (or logic), there may be a surveillance camera 2 in a neighboring building, apartment, room, etc. Therefore, in some embodiments, signal strength is used to approximate distance from the wireless video camera 2 and to discount a wireless video camera 2 that is likely not in the same room as the user.

Once the processor 44 (or logic) determines the likelihood that the user is in the presence of a wireless video camera 2, the processor 44 (or logic) emits a signal to warn the user of possible surveillance.

In the systems of FIGS. 3 and 4, the processor 44 (or logic) emits a tactile signal through an indication device 48 such as noise, light, vibration, heat, cold, or any combination of such. For example, the indication device 48 of FIG. 3 is any of an LED, a motor with an offset weight on a shaft of the motor, a sound emitting device, a buzzer, a vibration device, a chime, etc. In this way, the user wearing the system for detecting wireless video cameras 10 is warned of the possible presence of a wireless video camera 2.

Figure 8:
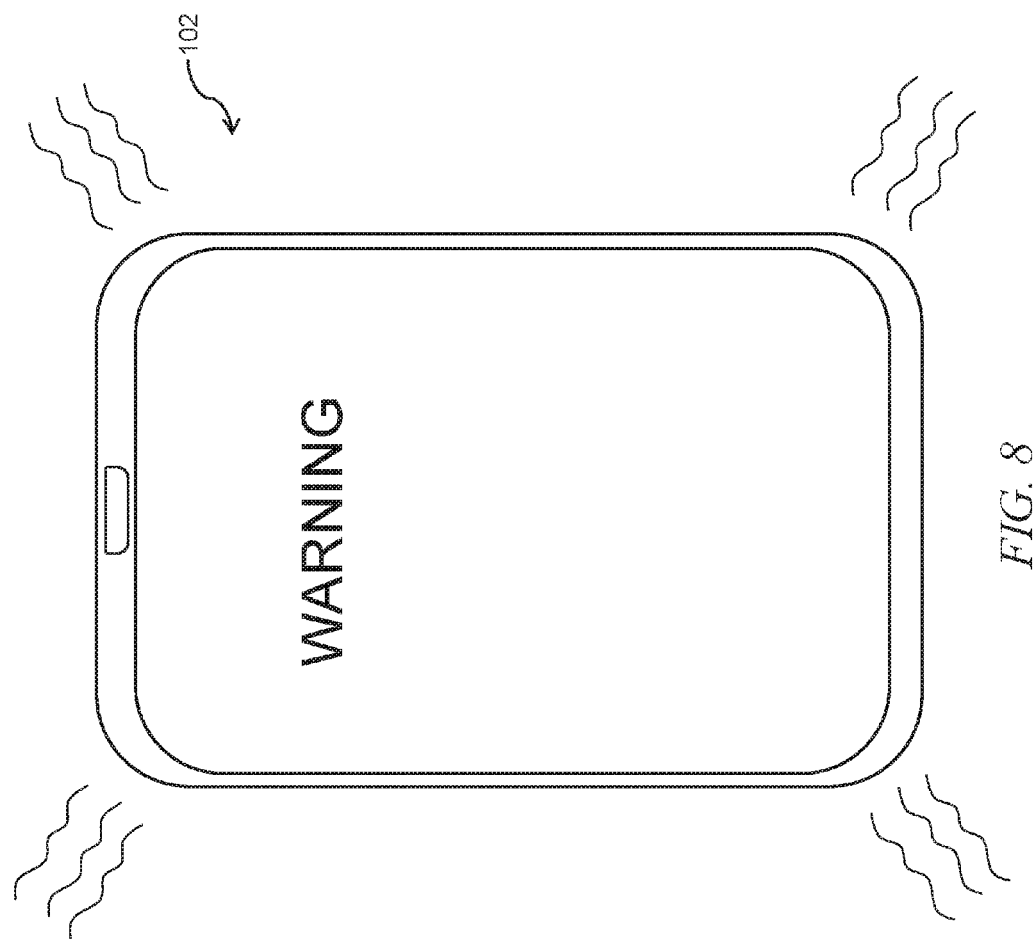
FIG. 8 illustrates a view of a cell phone receiving an indication of a detection of a local wireless video camera.
Figure 9:
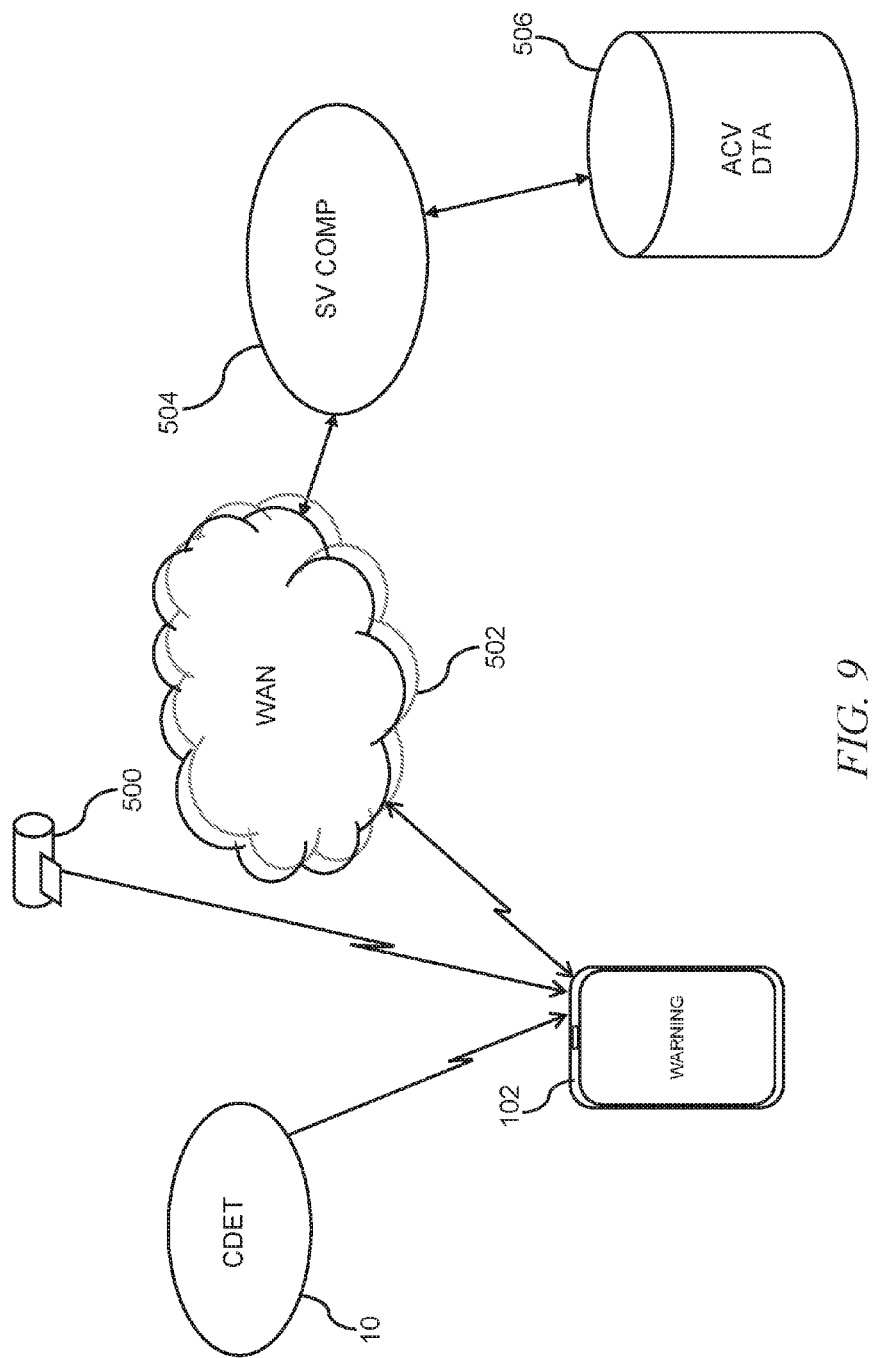
FIG. 9 illustrates a schematic view of a cell phone system for receiving and recording detections of local wireless video camera.

In the system of FIG. 5, the processor 44 (or logic) relays the indication/presence of a wireless video camera 2 to another device 100 or cell phone 102 or any other device capable of receiving a wireless signal from the system for detecting wireless video cameras 10 such as a music player, smart watch, etc. In such, the processor 44 (or logic) communicates with the device 100 or cell phone 102 over any known wireless transmission medium such as using infrared light or radio waves as in Wi-Fi or Bluetooth. As shown in FIGS. 8 and 9, the cell phone 102 receives then processes the signal in any of many ways that will be discussed such as recording the time, date, and/or location of the wireless video camera 2, forwarding the detection instance to a master database 506 for mapping locations of wireless video cameras 2, signaling the user is any of the many ways available at the device 100 or cell phone 102 (e.g., playing a ring tone, vibration, tones, etc.). Note, in this way, it is anticipated that the cell phone 102 will mimic reception of a phone call so that the user has an opportunity to pretend they are answering the call and taking alternate steps to remove themselves from the situation and location of the wireless video camera 2 without making the other party aware of the knowledge gained from the system for detecting wireless video cameras 10.

As the cell phone 102 receives and processes the signal such as recording the time, date, and/or location of the wireless video camera 2 and/or forwarding the detection event to a master database 506 for mapping locations of wireless video cameras 2, such information is often useful in the prosecution of those who have installed the wireless video cameras 2.

Figure 6:
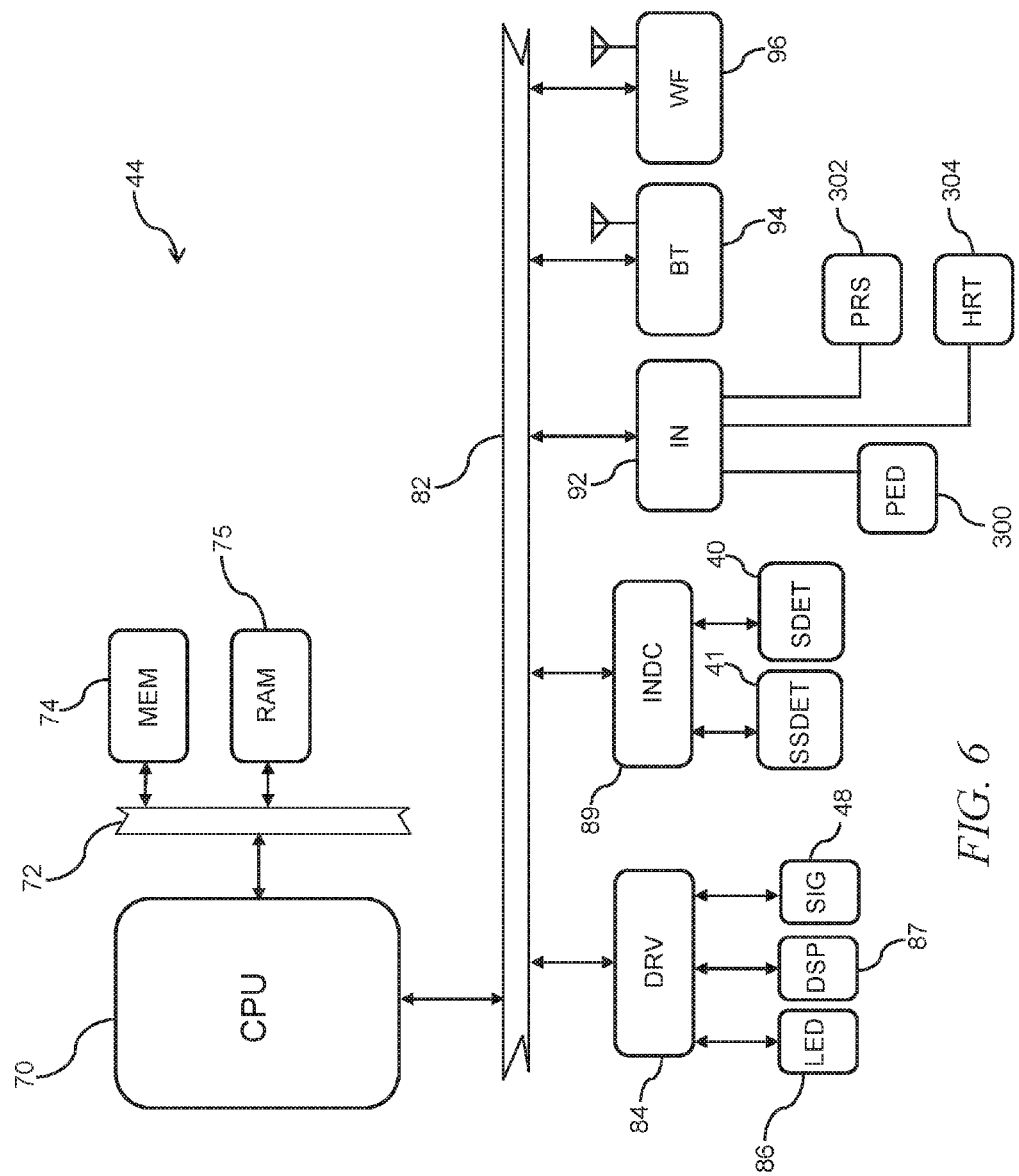
FIG. 6 illustrates a schematic view of an exemplary processing device as used within the system for detecting wireless video cameras.

Referring to FIG. 6, a schematic view of an exemplary processing device 44 as used within the system for detecting wireless video cameras 10 is shown. The exemplary processing device 44 represents a typical processor system as used with the system for detecting wireless video cameras 10, though as previously stated, it is known in the industry to utilize logic in place of processors and vice versa. This exemplary processing device 44 is shown in its simplest form. Different architectures are known that accomplish similar results in a similar fashion and the system for detecting wireless video cameras 10 is not limited in any way to any particular system architecture or implementation. In this exemplary processing device 44, a processor 70 executes or runs programs from a random access memory 75. The programs are generally stored within a persistent memory 74 and loaded into the random access memory 75 when needed. The processor 70 is any processor, typically a processor designed for portable devices. The persistent memory 74, random access memory 75 interfaces through, for example, a memory bus 72. The random access memory 75 is any memory 75 suitable for connection and operation with the selected processor 70, such as SRAM, DRAM, SDRAM, RDRAM, DDR, DDR-2, etc. The persistent memory 74 is any type, configuration, capacity of memory 74 suitable for persistently storing data, for example, flash memory, read only memory, battery-backed memory, magnetic memory, etc. In some exemplary processing devices 44, the persistent memory 74 is removable, in the form of a memory card of appropriate format such as SD (secure digital) cards, micro SD cards, compact flash, etc.

Also connected to the processor 70 is a system bus 82 for connecting to peripheral subsystems such as output drivers 84 and inputs 92 such as control switches. The output drivers 84 receive commands from the processor 70 and control the indication devices 48, in this example, one or more LEDs 86 and/or other indication devices 48 (e.g. sound, vibration).

In general, some portion of the memory 74 is used to store programs, executable code, and data such as previous encounters with wireless video cameras 2. In some embodiments, other data is stored in the memory 74 such as audio files, etc.

The outputs of the sync detector 40 and/or signal strength detectors 41 are read through, for example, an input port 89 or other logic system as known in the industry.

The peripherals and sensors shown are examples and other devices are known in the industry such as Global Positioning Subsystems, speakers, microphones, USB interfaces, Bluetooth transceivers 94, Wi-Fi transceivers 96, image sensors, temperature sensors, fitness/health sensors 300/302/304, etc., some of which are not shown for brevity and clarity reasons.

In some embodiments, local area communications with the exemplary processing device 44 are through a wireless transmitter or transceiver 50 (see FIG. 5) such as a Bluetooth radio transceiver 94, a Wi-Fi radio transceiver 96, or both. Such communication features provide data communications between the system for detecting wireless video cameras 10 and, for example, cell phone 102 and/or other devices such as a personal computers, music players, etc.

Figure 7:
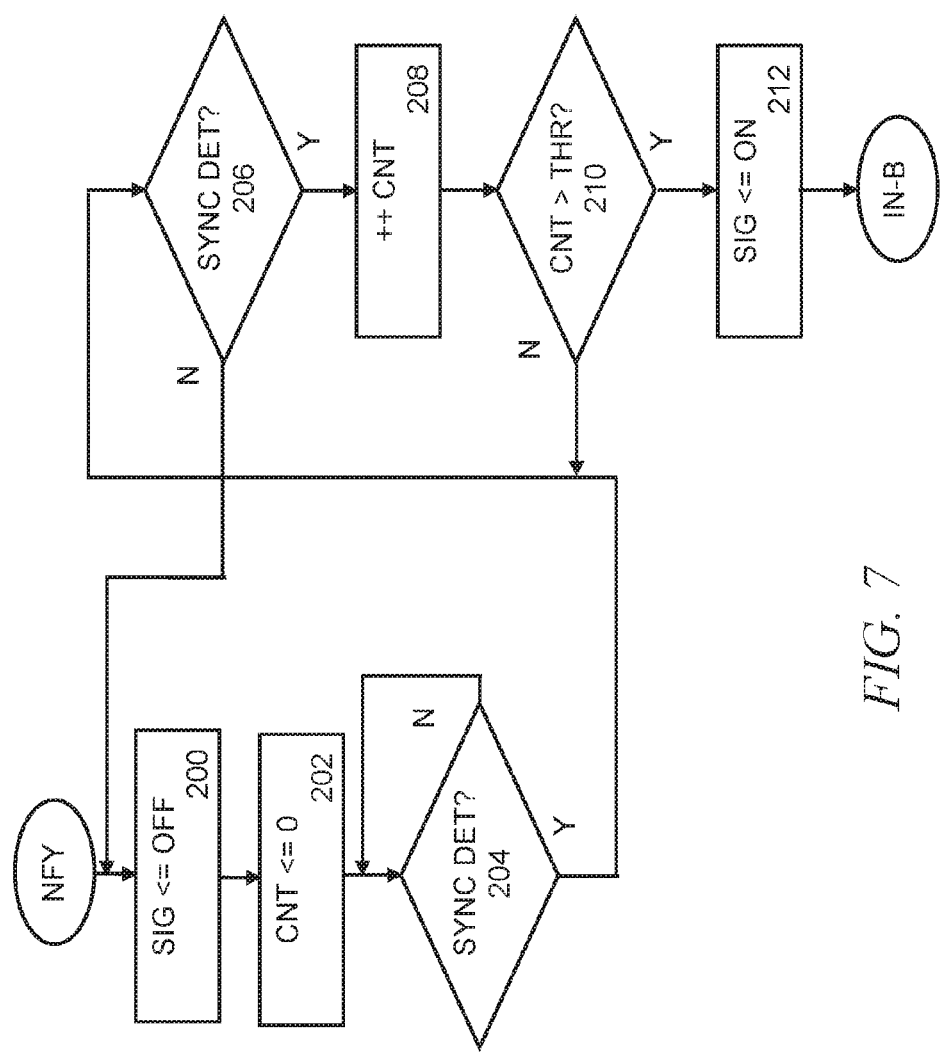
FIG. 7 illustrates a flow chart of exemplary software running on the processing device as used within the system for detecting wireless video cameras.

Referring to FIG. 7, a flow chart of exemplary software running on the processing device as used within the system for detecting wireless video cameras 10 is shown. In this exemplary flow, the notification of a wireless video camera 2 starts by making sure the indication device 48 is off 200. In embodiments in which the system for detecting wireless video cameras 10 communicates with another device 100 or cell phone 102, the step of making sure the signaling is off 200 includes initiating a wireless transaction through a transmitter or transceiver 50 to an application running on the device 100 or cell phone 102 informing the device 100 or cell phone 102 that there is presently no wireless video camera 2 in range.

A counter is reset 202 (in this case set to zero, though it is well known in the industry as to how to count events).

Now, the status of the sync detector 40 is monitored 204 for detection of a sync signal. Once a sync signal is detected 204, a loop is entered 206-210 in which the software checks to see if another sync has been detected 206 (or the sync detector is still detecting sync signals 206), an if so, the counter is incremented 208 (or adjusted as counters are well known), and the counter is then tested to see if a threshold is reached 210 such as a predetermined number of sync pulses have been received, etc. If the counter reaches the threshold 210, then the indication device(s) 48 is/are enabled 212 informing the user that there is a wireless video camera 2 within range. In examples in which the system for detecting wireless video cameras 10 communicates with another device 100 or cell phone 102, the step of signaling 212 includes initiating a wireless transaction through the transmitter/transceiver 50 (e.g. Bluetooth 94 or Wi-Fi 96) to an application running on the device 100 or cell phone 102 informing the device 100 or cell phone 102 that there is a wireless video camera 2 in range, responsive to which the device 100 or cell phone 102 will take actions such as illuminating a device, vibrating, making a noise, logging the event, determining the current location and recording that location along with the event, etc.

If, at any time during the loop 206-210, it is determined that sync pulses are no longer being received, flow continues at step 200 where the signal device is disabled 200 and the counter again reset 202.

After the indication device 48 is enabled 212 to start indicating by sight, sound, heat, touch, etc., the system for detecting wireless video cameras 10 has successfully notified the user of the possibility of at least one wireless video camera 2 being in use in the user's vicinity. After notifying the user, many operations are envisioned, including, a user operation to reset the system for detecting wireless video cameras 10 (e.g. a momentary-contact switch), a timer is set after which the system for detecting wireless video cameras 10 resets, the system for detecting wireless video cameras 10 signals until out of range of any wireless video cameras 2, etc.

Referring to FIG. 8, a plan view of a cell phone receiving an indication of a detection of a local wireless video camera 2 is shown. FIG. 8 refers to FIG. 5, in which, upon detection of information that indicates a wireless video camera 2 is in range of the system for detecting wireless video cameras 10, a transaction is sent to the user's device 100 or cell phone 102 (in this example, to the user's cell phone 102) and the device 100 or cell phone 102 signals by, for example, making noise, displaying a message, illuminating a LED, vibrating, playing a ring tone, etc.

Note, that by playing a ring tone or making a sound similar to receiving a text message, the user is presented with the assumption that a wireless video camera 2 is within range yet, the person who placed the wireless video camera 2 is not informed, believing instead that the user has received a text message or has received a phone call.

Referring to FIG. 9, a schematic view of a cell phone system for receiving and recording detections of local wireless video camera is shown. As discussed, upon detection of a wireless video camera 2, in some exemplary systems, a transaction is sent from the system for detecting local wireless video camera 10 to the user's cell phone 102. Once receiving the transaction from the system for detecting local wireless video camera 10, the cell phone 102 has many options. As discussed prior, in some systems, the cell phone 102 indicates to the user that a wireless video camera 2 is nearby, through any of the possible mechanisms available to cell phones 102. Additionally, or instead of, the system for detecting local wireless video camera 10 consults the cell phones Global Positioning System (GPS) to determine the cell phone's 102 location by receiving timing signals from Global Positioning Satellites 500.

In some embodiments, the position (e.g., location by name or coordinates) is stored locally. In some embodiments, the indication of a nearby wireless video camera 2 is forwarded to a server system 504, for example, through a wide area network 502 such as through the cellular system and/or Internet. The server system 504 records the location of the wireless video camera 2 in a database 506 for various future uses such as providing mapping data for all detected wireless video cameras 2, or for law enforcement should something happen to the user or if the user initiates legal proceedings. Note that by storing this location information, and optionally other information such as the band on which the wireless video camera 2 was transmitting and the signal strength, law enforcement officials are better able to determine what happened at a potential crime scene. As one would expect, if a crime occurs, the user's cell phone 102 may be destroyed or lost, but records of the occurrence will be stored in the database 506 and it will be difficult for the criminal to destroy such records.

Referring to FIG. 10, a perspective view of an exemplary body-worn device 150 that includes the system for detecting local wireless video camera 10 is shown. This is but one example of packaging the system for detecting local wireless video camera 10. Any housing is anticipated, including other types of user-worn packaging such as pendants, clips, rings, etc. Alternately, the housings for carrying in purses, wallets, pockets, etc., are also anticipated. It is also anticipated that the packaging have similar looks and, in some embodiments, functions as an existing object such as a pocket watch, pen, key fob, etc. In all packaging, the package is typically made of a material that is a good choice for the package. Although any material that matches the desired packaging is anticipated, to reduce attenuation of signals from a targeted wireless video camera 2, in a preferred embodiment, the packaging is made substantially of silicone or fluoroelastomer. In preferred embodiments, the use of metals is limited as metals typically interfere with the reception and detection of wireless signals.

In the example shown in FIG. 10, a bracelet 150 encloses the system for detecting local wireless video camera 10. The bracelet 150 has a band 152 that is fabricated of a material such as silicone or fluoroelastomer. The band 152 contains the system for detecting local wireless video camera 10 with antenna 9 in this example, the power source is not shown for clarity reasons. In some embodiments, the system for detecting local wireless video camera 10 is integrated with other functionality that is known such as watch mechanisms, exercise tracking devices, smart watches, etc.

As with all portable electronic devices, a source of power is needed, and any known source of power is anticipated including, but not limited to, removable batteries (e.g., a lithium cell, AAA batteries), rechargeable batteries (e.g., rechargeable lithium battery), solar power, power from wrist movement, a chargeable supper capacitor, and any combination of power sources.

Figure 11:
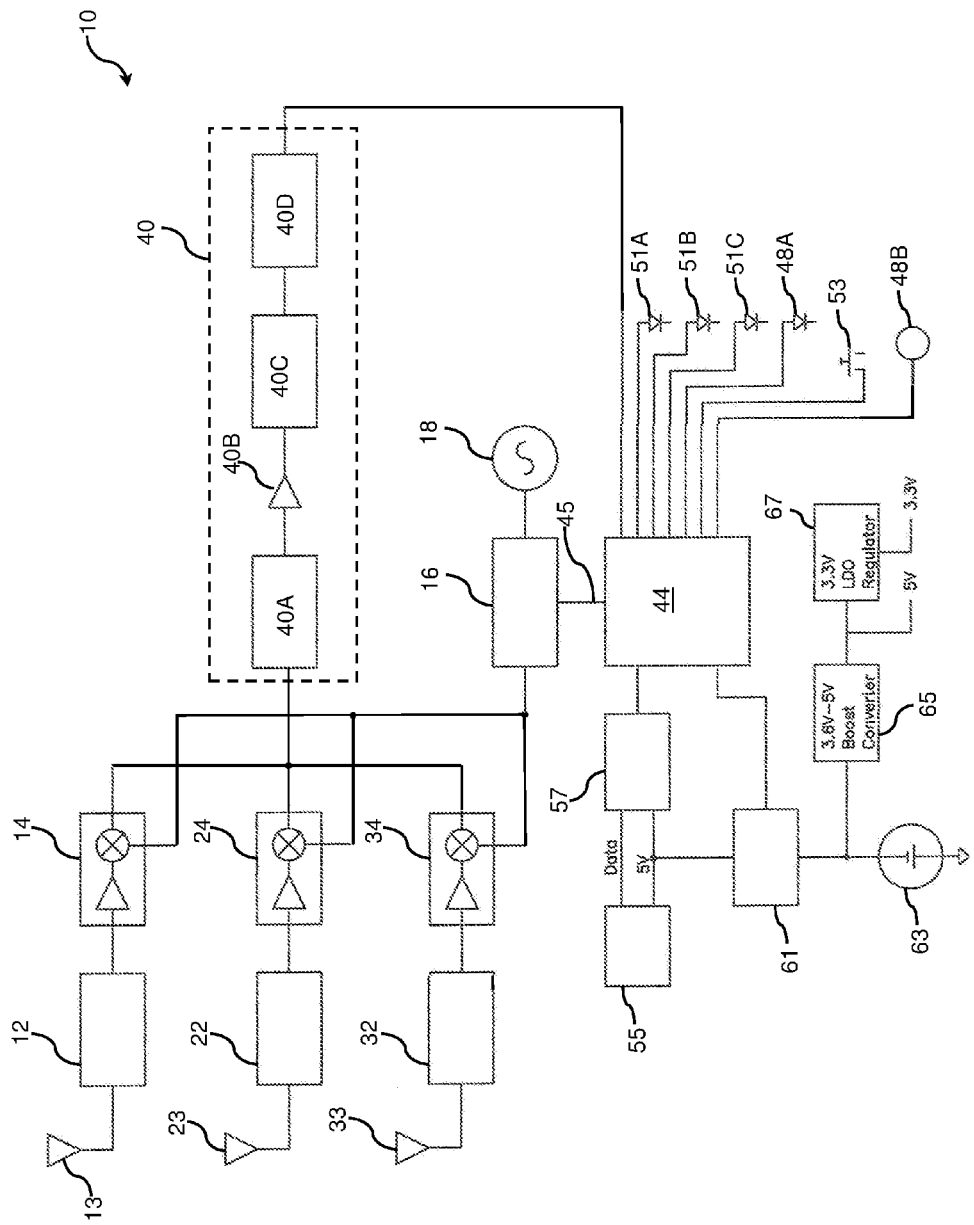
FIG. 11 illustrates a schematic drawing of an exemplary implementation of the system for detecting local wireless video camera.

Referring to FIG. 11, a schematic drawing of an exemplary implementation of the system for detecting local wireless video camera 10 is shown. Radio frequency signals emitted by the wireless video camera 2 are received by one or more antenna 13/23/33 of the system for detecting wireless video cameras 10. Each antenna is anticipated to be tuned to one of the anticipated radio frequencies or a band of the anticipated radio frequencies. Although any small sized antenna 13/23/33 (e.g. micro-antenna) is anticipated, in the example shown, small surface mount chip antennas 13/23/33 are used for intercepting radio frequency energy from a wireless frequency modulated video camera. The first antenna 13 is tuned in the 902-928 MHz ISM band, the second antenna 23 is tuned in the 2.40-2.50 GHz ISM band, and the third antenna 33 is tuned in 5.725-5.875 GHz ISM band.

The radio frequency signal from the antenna 9/13/23/33 is then detected by one or more detectors 12/22/32, each detector filtering out radio frequency energy above the requisite frequency bands. The first detector 12 is a band pass filter tuned in the 902-928 MHz ISM band, the second detector 22 is a band pass filter tuned in the 2.40-2.50 GHz ISM band, and the third detector 32 is a band pass filter tuned in the 5.725-5.875 GHz ISM band.

The output of each detector 12/22/32 is modulated video signal. Each output (modulated video signal) is coupled to a respective down converter 14/24/34 which converts the signal at the radio frequency carrier to a lower intermediate frequency (IF) for signal gain and detection of the video signals.

In this example, an 800 MHz to 6.2 GHz frequency synthesizer 16 provides a programmable frequency to the down converters 14/24/34 under control of the processor 44 (or logic). In this, the processor 44 includes firmware that scans each band (e.g., the 902-928 MHz, 2.40-2.50 GHz, and 5.725-5.875 GHz ISM bands) until an FM video signal is detected. A reference clock 18 (e.g., tuned crystal) provides a fixed frequency to which the frequency synthesizer 16 internally locks (phase lock).

Outputs of the down converters 14/24/34 are combined and feed a sync detector 40. The sync detector 40 includes an intermediate frequency band pass filter 40A which passes only the energy within the pass band of the filter and sharply attenuates any out of band energy prior to the signal gain stage. An intermediate frequency amplifier 40B provides gain to the filtered intermediate frequency from the intermediate frequency band pass filter 40A which feed an intermediate frequency, frequency modulated video demodulator 40C (demodulator) which processes the intermediate frequency signal containing, in many countries, the NTSC FM video signal into the base band which contains the horizontal sync pulse. Note that the exemplary design of FIG. 11 is geared toward NTSC systems while it is fully anticipated that, in some countries, similar functions produce similar results for PAL or SECAM transmissions.

The base band signal is passed from the demodulator 40C to a sync pulse detector 40D. The sync pulse detector 40D detects envelope and horizontal sync pulses. For NTSC transmissions, the sync pulse detector 40D detects the 15.734 KHz horizontal sync pulse and provides signals to the processor 44. The processor examines the signals to validate the presence of a video signal.

The output of the synchronization detector 40D is monitored by a processor 44 or logic 44 (e.g. a logic array) to determine and/or record instances of video transmission. The detection of a single synchronization pulse is generally not indicative of a wireless video camera 2, but the detection of several sequential synchronization pulses by the processor 44 (or logic), especially if the synchronization pulses are separated in time by a standard amount as defined, for example, by the National Television System Committee (NTSC) standard in North America (e.g. synchronization pulses approximately every 16.6 milliseconds). Again, note that in various parts of the world, other standards and timing are utilized such as Phase Alternating Line (PAL) and Sequential Color with Memory (SECAM).

Once the processor 44 (or logic) determines the likelihood that the user is in the presence of a wireless video camera 2, the processor 44 (or logic) emits a signal to warn the user of possible surveillance through a transducer 48B such as noise, vibration, heat, cold, or any combination of such. Another example of a signaling device is an LED 48A. In this way, the user wearing (or having) the system for detecting wireless video cameras 10 is warned of the possible presence of a wireless video camera 2.

In some embodiments, the processor 44 records detections of wireless video camera 2 in persistent memory 74 along with any other information available such as signal strength, the band on which the video was detected, the time/date, etc.

In the example shown, the system for detecting local wireless video camera 10 includes a micro USB (Universal Serial Bus) connector 55 for providing power for charging and, optionally, for data communication with another device 100 or cell phone 102. In embodiment in which data communications is provided through the micro USB connector 55, a USB host controller 57 provides logic to process the USB protocols and exchange data between the other device 100 or cell phone 102 and the processor 44. In such, it is anticipated that any data regarding a detection of a wireless video camera 2 be read from the system for detecting local wireless video camera 10 through the USB connector 55 and USB host controller 57. Additionally, other communications are anticipated including, but not limited to, software/firmware updates, setting parameters, clearing prior detections, etc.

Although any power source is anticipated, this example has a rechargeable battery 63, typically a rechargeable Lithium ion battery. When the micro USB connector 55 is connected to a USB host of the other device 100 or cell phone 102, power from the USB connector 55 is used to charge the rechargeable battery 63 through a battery charging circuit 61. In operation, power from the rechargeable battery 63 is conditioned and boosted to five volts (5V) by a boost converter 65 and a lower voltage (3.3V) is provided by a low drop-out regulator 67, though there are many ways known to provide the requisite voltage and current required by the various circuits described above, all of which are anticipated and included here within.

For completeness, other indicators (LEDs) 51A/516/51C are provided to indicating scanning is operational 51A, battery charging 51B, and low battery 51C. Although shown as independent LEDs 51A/516/51C, it is known to combine multiple color LEDs into single devices. There is no limit on the type and usage of indicators and those shown are examples that, in some embodiments, are not present.

Further, for completeness, a switch 53 is shown, for example, a power switch that, when pressed, initiates operation of the system for detecting local wireless video camera 10 and when pressed again, stops operation of the system for detecting local wireless video camera 10 to conserve power. This is an example of such a switch 53 as more or less switches and alternate uses are anticipated such as a single short press to initiate operation, another single short press to reset operation such as when the indicator(s) 48A/48B indicate the presence of a wireless video camera 2, a long press to stop operation, etc.

In some embodiments, the system for detecting local wireless video cameras 10 automatically enters a low-power state after scanning for the presence of a wireless video camera 2 for battery preservation reasons. To initiate another scan, for example, when a user enters a new location, the user presses the switch 53, which again powers the system for detecting local wireless video camera 10 and initiates a scan looking for wireless video cameras 2.

Figure 12:
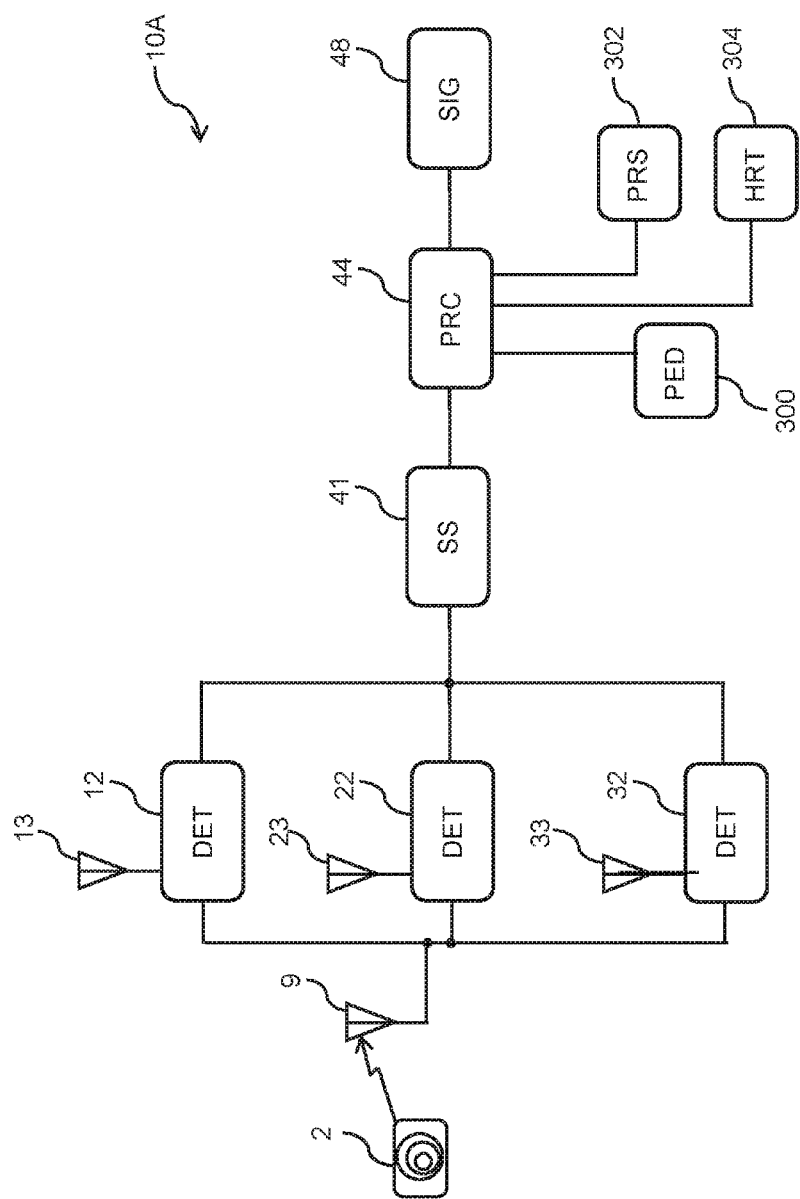
FIG. 12 illustrates a schematic view of a system for detecting wireless video cameras using signal strength.

Referring to FIG. 12, a schematic view of a system for detecting wireless video cameras 10A using signal strength is shown. Note that in this example, a simplified system for detecting wireless video cameras 10A is shown for clarity purposes. It is fully anticipated that in some systems for detecting wireless video cameras 10A, more or less detectors 12/22/24 are employed and/or additional detectors to recognize other video transmission schemes such as transmitting video over Bluetooth, Wi-Fi (e.g. IEEE 802.11), or light wave transmission, for example, over infrared. It is further understood that any type and number of indication devices 48 be employed such as illuminated indicators (e.g., LEDs), vibration indicators (e.g., micro-motor with offset weight on shaft), sounders, buzzers, bells, a display 87, etc. In some embodiments, there is no indication devices 48 within the system for detecting wireless video cameras 10A and, instead, the system for detecting wireless video cameras 10A emits a wireless signal (e.g. Bluetooth) that is linked to another device such as a cell phone 102 or device 100, which logs the event (and possibly the location) and, optionally, makes an indication of detection by, for example, displaying a message, vibrating, making noise, illuminating, etc.

Figure 14:
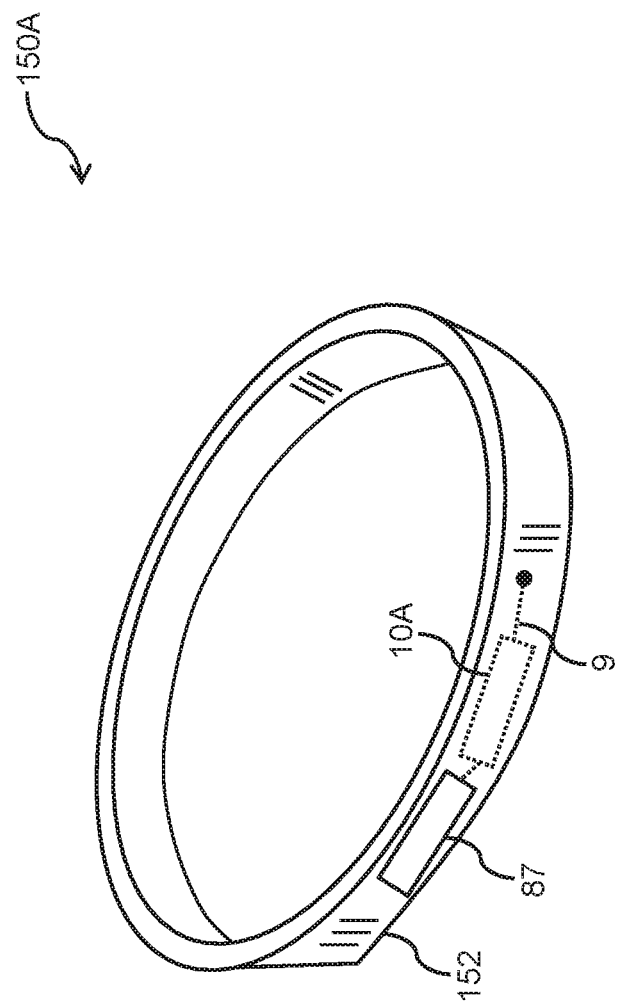
FIG. 14 illustrates a perspective view of an exemplary body-worn embodiment of the system for detecting local wireless video camera with fitness/health tracker.

It is also anticipated that the system for detecting wireless video cameras 10A be packaged in any portable format and include alternate functionality, as a fitness/health tracker function is shown. For example, as shown in FIG. 14, the system for detecting wireless video cameras 10A is integrated into an ornamental bracelet 150A, including a fitness/health tracker, therefore, the system for detecting wireless video cameras 10A takes the form of fashion. In other body-worn or portable packaging options, the system for detecting wireless video cameras 10A is packaged as a pendant, pin, cuff link, earring, etc. In some embodiments, the packaging is designed to be worn while in others, the packaging is designed to be carried in, for example, a handbag, purse, wallet, pocket, etc. The small size and packaging design provides some degree of camouflage. It is anticipated that after some amount of time in public, people will start to recognize the style, shape, and color of such packages. Therefore, some packaging is designed to be stealthier, fitting inside a purse or handbag, or in one's pocket or clipped onto clothing, belts, socks, or pockets. Further, it is also anticipated that as various designers create fashion accessories that have cavities for storing small electronic devices such as exercise trackers, diet trackers, health monitors, etc., the packaging is designed to fit within such cavities.

In the system for detecting wireless video cameras 10A as per FIG. 12, the radio frequency signal emitted by the wireless video camera 2 is received by one or more antenna 9/13/23/33 of the system for detecting wireless video cameras 10A. In some embodiments, each anticipated radio frequency is received by separate antennae 13/23/33 (or elements), and in such, each antenna is anticipated to be tuned to one of the anticipated radio frequencies or a band of the anticipated radio frequencies. In some embodiments, a single antenna 9 is used to receive all anticipated radio frequencies. Any small sized (e.g. micro-antenna) is anticipated. In some examples, one or more antenna 9/13/23/33 with multiple elements for receiving multiple radio frequencies or bands of radio frequencies is used.

The radio frequency signal from the antenna 9/13/23/33 is then detected by one or more detectors 12/22/32, each detector operating on one or more frequencies on which wireless video cameras 2 typically operate. Although it is shown that the detectors 12/22/32 operate on specific frequencies, it is fully anticipated that some detectors 12/22/32 sweep over a series or range of frequencies, stopping when finding a radio frequency signal that has significant signal strength.

The output of each detector 12/22/32 is a modulated video signal. Each output (modulated video signal) is coupled to a signal strength detector 41. If any of the detectors 12/24/34 detect video output indicative of a video transmission, this presence of a video signal is detected and measured by the signal strength detector 41 and the output of the signal strength detector 41 indicates the presence of a video signal (e.g. a binary indication if the signal strength is greater than a threshold or an analog indication representative of the signal strength).

The output of the signal strength detector 41 is monitored by a processor 44 or logic 44 (e.g. a logic array) to determine and/or record instances of video transmission. The detection of a short duration signal is generally not indicative of a wireless video camera 2, as wireless video cameras 2 typically transmit continuously. Therefore, the detection of a signal strength over a threshold for a period of time by the processor 44 (or logic), is indicative of reception of a video signal from a camera 2.

In this embodiment, other sensors 300/302/304 are operatively coupled to the processor 44 for inclusion of the functionality of a fitness/health tracker. In this example, a pedometer sensor 300 is included to detect steps being taken by a user, a pressure sensor 302 is included to detect barometric pressure for determining climbing of flights of steps by the user, and a heart rate sensor 304 is included to measure the user's heart rate. Note that in other embodiments, more or less sensors 300/302/304 are envisioned.

Although the presence of a signal of a strength that exceed a threshold for a period of time is deemed a good indication of the presence of a wireless video camera 2, it is fully anticipated that other factors be also considered such as synchronization pulses as in FIGS. 3-6.

Once the processor 44 (or logic) determines the likelihood that the user is in the presence of a wireless video camera 2, the processor 44 (or logic) emits a signal and/or displays a message to warn the user of possible surveillance.

Figure 13:
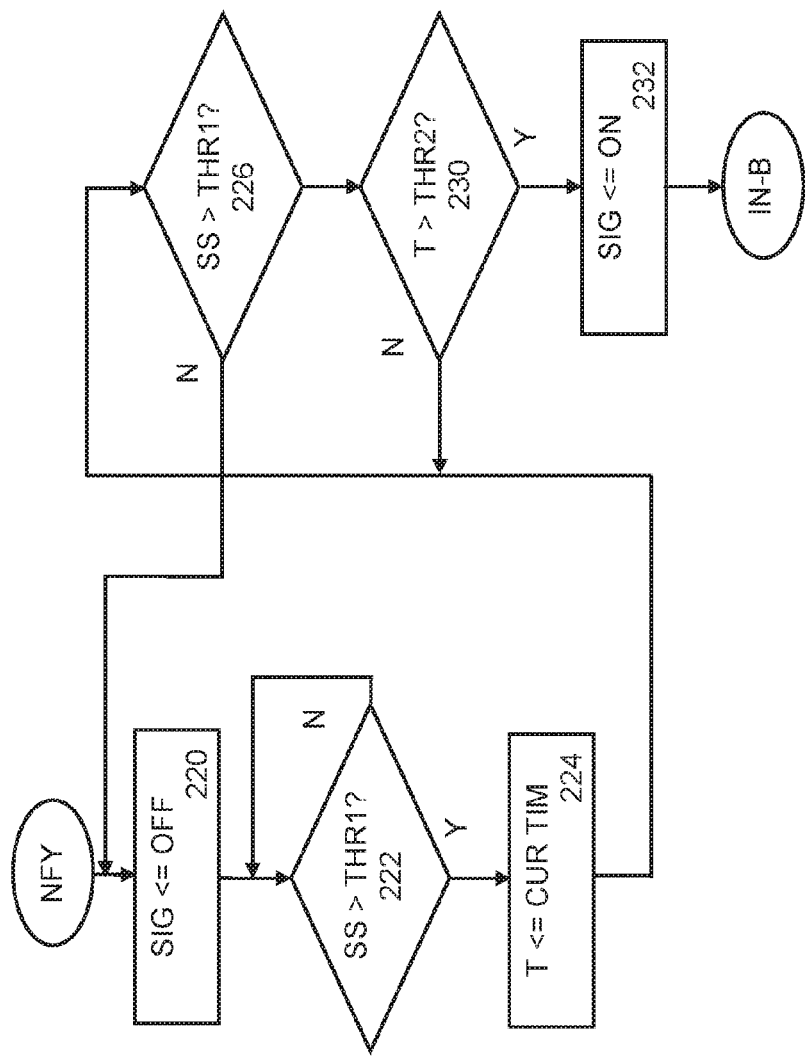
FIG. 13 illustrates a flow chart of exemplary software running on the processing device as used within the system for detecting wireless video cameras using signal strength.

Referring to FIG. 13, a flow chart of exemplary software running on the processing device as used within the system for detecting wireless video cameras 10A using signal strength is shown. In this exemplary flow, the notification of a wireless video camera 2 starts by making sure the indication device 48 is off 220. In embodiments in which the system for detecting wireless video cameras 10A communicates with another device 100 or cell phone 102, the step of making sure the signaling is off 220 includes initiating a wireless transaction through a transmitter or transceiver 50 to an application running on the device 100 or cell phone 102 informing the device 100 or cell phone 102 that there is presently no wireless video camera 2 in range.

Now, the status of the signal strength detector 41 is monitored 222 for detection of a video camera signal. Once a signal of strength greater than a first threshold (THR1) is detected 222, the current time is recorded 224 and a loop is entered 226-232 in which the software checks to see if the signal of strength is still greater than 226 the first threshold (THR1), an if so, it is checked to see if a second threshold of time (THR2) has elapsed 230 (e.g. the signal strength has been over the first threshold (THR1) for an amount of time of the second threshold of time (THR2)). If the second threshold of time (THR2) has elapsed 230, then the indication device(s) 48 (signaling devices) is/are enabled 232 (or message displayed on the display 87) informing the user that there is a wireless video camera 2 within range. In examples in which the system for detecting wireless video cameras 10A communicates with another device 100 or cell phone 102, the step of signaling 232 includes initiating a wireless transaction through the transmitter/transceiver 50 (e.g. Bluetooth 94 or Wi-Fi 96) to an application running on the device 100 or cell phone 102 informing the device 100 or cell phone 102 that there is a wireless video camera 2 in range, responsive to which the device 100 or cell phone 102 will take actions such as illuminating a device, vibrating, making a noise, logging the event, determining the current location and recording that location along with the event, etc.

If, at any time during the loop 226-230, it is determined that signal strength has decreased below the first threshold (THR1), flow continues at step 220 where the signal device is disabled 200.

After indication device 48 is enabled 232 to start indicating by sight, sound, heat, touch, etc., the system for detecting wireless video cameras 10A has successfully notified the user of the possibility of at least one wireless video camera 2 being in use in the user's vicinity. After notifying the user, many operations are envisioned, including, a user operation to reset the system for detecting wireless video cameras 10A (e.g. a momentary-contact switch), a timer is set after which the system for detecting wireless video cameras 10A resets, the system for detecting wireless video cameras 10A signals until out of range of any wireless video cameras 2, etc.

Referring to FIG. 14, a perspective view of an exemplary body-worn device 150A that includes the system for detecting local wireless video camera 10A with fitness/health tracker is shown. This is but one example of packaging 152 the system for detecting local wireless video camera 10A. Any housing is anticipated, including other types of user-worn packaging such as pendants, clips, rings, etc. Alternately, the housings for carrying in purses, wallets, pockets, etc., are also anticipated. It is also anticipated that the packaging have similar looks and, in some embodiments, functions as an existing object such as a pocket watch, pen, key fob, etc. In all packaging, the package is typically made of a material that is a good choice for the package. Although any material that matches the desired packaging is anticipated, to reduce attenuation of signals from a targeted wireless video camera 2, in a preferred embodiment, the packaging is made substantially of silicone or fluoroelastomer. In preferred embodiments, the use of metals is limited as metals typically interfere with the reception and detection of wireless signals.

In the example shown in FIG. 14, a bracelet 150A encloses the system for detecting local wireless video camera 10. The bracelet 150A has a band 152 that is fabricated of a material such as silicone or fluoroelastomer. The band 152 contains the system for detecting local wireless video camera 10A with antenna 9 and display 87 in this example, the power source is not shown for clarity reasons. In this embodiment, the system for detecting local wireless video camera 10A is integrated with a fitness/health tracker. In some embodiments, the system for detecting local wireless video camera 10A is integrated with other functionality such as watch mechanisms, smart watches, etc.

As with all portable electronic devices, a source of power is needed, and any known source of power is anticipated including, but not limited to, removable batteries (e.g., a lithium cell, AAA batteries), rechargeable batteries (e.g., rechargeable lithium battery), solar power, power from wrist movement, a chargeable supper capacitor, and any combination of power sources.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A portable system for detecting wireless video cameras, the portable system comprising:
   an enclosure;
   a plurality of video receivers, each of the video receivers operating in a radio frequency band used for video transmission, each of the video receivers housed within the enclosure;
   an antenna interfaced to each of the video receivers and housed within the enclosure, each of the antennas operatively coupled to a respective video receiver of the video receivers;

a signal strength detector connected to the outputs of the video receivers, the signal strength detector housed within the enclosure;

an indication device housed within the enclosure;

a processor housed within the enclosure, the processor operatively coupled to the output of the signal strength detector and coupled to the indication device such that, responsive to the signal strength detector determining that a signal on one of the radio frequency bands exceeds a predetermined threshold, the processor initiates operation of the indication device;

at least one sensor housed within the enclosure and operatively coupled to the processor, the at least one sensor providing fitness/health data such that the processor presents fitness/health data on a display that is operatively coupled to the processor.

2. The portable system for detecting wireless video cameras of claim 1, wherein the indication device is selected from the group comprising a visual indication device, an LED, a buzzer, a sound emitting device, a heat emitting device, and a vibration emitting device.

3. The portable system for detecting wireless video cameras of claim 1, wherein each of the video receivers comprises a band pass filter tuned to the radio frequency band.

4. The portable system for detecting wireless video cameras of claim 3, wherein the at least one sensor is selected from the group consisting of a pedometer sensor, a pressure sensor, and a heart rate sensor.

5. The portable system for detecting wireless video cameras of claim 3, wherein the radio frequency band is selected from the group consisting of a 902-928 MHz unlicensed radio frequency band, a 2.40-2.50 GHz unlicensed radio frequency band, and a 5.725-5.875 GHz unlicensed radio frequency band.

6. The portable system for detecting wireless video cameras of claim 1, wherein the enclosure is in a shape of a clip.

7. The portable system for detecting wireless video cameras of claim 1, wherein the enclosure is in a shape of bracelet on a necklace.

8. The portable system for detecting wireless video cameras of claim 7, wherein the bracelet is made of a material selected from the group consisting of silicone and fluoroelastomer.

9. The portable system for detecting wireless video cameras of claim 1, further comprising a wireless transceiver coupled to the processor.

10. The portable system for detecting wireless video cameras of claim 9, wherein, responsive to the signal strength detector determining that the output of the signal strength detector exceeds the predetermined threshold, the processor initiates a transaction to a device over the wireless transceiver.

11. The portable system for detecting wireless video cameras of claim 9, wherein, the processor periodically transmits the fitness/health data over the wireless transceiver.

12. A portable system for detecting wireless video cameras, the portable system comprising:

an enclosure;

a video receiver comprising a plurality of antenna, each antenna is coupled to a band pass filter that is tuned to a radio frequency band, the video receiver housed within the enclosure;

a signal strength detector operatively coupled to the video receiver;

an output of the signal strength detector is coupled to a processor, the output of the signal strength detector proportional to a signal strength of a signal in the radio frequency band of one of the antenna, the signal strength detector housed within the enclosure;

the processor determines if the portable system for detecting wireless video cameras is receiving a wireless video signal by the signal strength exceeding a threshold for a period of time, and responsive to detecting, the processor initiates operation to notify of the presence of the wireless video signal, the processor housed within the enclosure; and at least one fitness/health sensor housed within the enclosure and operatively coupled to the processor, the processor receiving fitness/health data from the at least one fitness/health sensor, the processor deriving fitness/health information from the fitness/health data and the processor displaying the fitness/health information on a display that is housed within the enclosure and operatively coupled to the processor.

13. The portable system for detecting wireless video cameras of claim 12, wherein the at least one fitness/health sensor is selected from the group consisting of a pedometer sensor, a pressure sensor, and a heart rate sensor.

14. The portable system for detecting wireless video cameras of claim 13, wherein the processor initiates operation to notify of the presence of the wireless video signal using a device selected from the group comprising initiating a visual indication device, turning an LED on, buzzing, sounding, heating, and vibrating.

* * * * *